UNITED STATES PATENT OFFICE.

JOHN B. McMUNN, OF PORT JERVIS, NEW YORK.

LUBRICATING COMPOUND.

Specification forming part of Letters Patent No. 26,693, dated January 3, 1860.

*To all whom it may concern:*

Be it known that I, JOHN B. McMUNN, of Port Jervis, in the county of Orange and State of New York, have invented a new and Improved Composition to be Employed for the General Purposes of a Lubricator; and I do hereby declare that the following is a full and exact description thereof, reference being had to the accompanying specimens, and to the letters of reference marked thereon.

The nature of my invention consists in making a lubricating composition to be applied to the preventing of the rolling and sliding frictions in railroad-cars, steam-engines, and machinery of all kinds, and which, while it will economize power by so doing, will not gum, but keep the journals and axles clean and cool. The alkaline base of the composition is a solution of the carbonate of potassa in water, which unites and forms combinations with oleine and stearine—the proximate acid principles of animal and vegetable oils and fats and tallow—and with cerine—the acid principle of beeswax and myrtle-wax. In the process the oil and beeswax are first decomposed by being dissolved in the alkaline solution, which, being a strong base, displaces and sets free the glycerine—the weaker natural base of oils, &c.—and probably the myricine—the base of beeswax—by the process of simple elective affinity, the result of which is that the alkali and the acids combine with one another in such proportions as they unite at the temperature of about 200° Fahrenheit, and form a uniform saponaceous-like compound, which after standing in repose a few days, separates into two parts, one of which is a watery liquid known as "under lye," and contains the separated basis of the oil and some free potassa. This part subsides, and leaves the other as a homogeneous slippery-feeling mass, consisting of the saline compounds of potassa and the ceric and fat acids in a state of thick solution. As the under lye is incompatible with the superincumbent mass, and will not readily unite with it without again separating, it is therefore rejected by being drained off or otherwise got rid of. The residual compound is then susceptible of being mixed with water, and may be thereby reduced to a thinner consistency, as desired for practical use, as in the specimen marked E.

To enable others skilled in the art to make and use my invention, I will proceed to describe the manner of decomposing the original ingredients and of preparing and combining their acid principles and the alkali to form the composition.

I put into a kettle one gallon of whale-oil, (a specimen of which is marked A,) and heat it hot, and then I put into a small kettle five and a half ounces of beeswax, (a specimen of which is in the box marked B,) and heat it till it is melted and fluid, and then I pour it into the kettle with the oil and stir them well together until they are intimately mixed, which they will be in three or five minutes. Then I make one gallon of the solution of carbonate of potassa by dissolving seven ounces of it in one gallon of soft boiling water, which must be stirred well till it is dissolved, (a specimen of which is marked C,) and when that is done, and it is at the temperature of between 180° Fahrenheit and 200° Fahrenheit, I pour it slowly into the other mixture, which should be of the same degree of heat, and then stir them all together for eight or ten minutes. After that I pour the whole out into a small tub, and continue to stir it uniformly till it is quite cold, to keep the ingredients together and to favor the decomposition of the oil and beeswax, and also the displacement of their natural bases and the union of their acids with the alkali. Then I set it aside and leave it undisturbed for ten or twelve days. At the expiration of that time I tap the tub at the bottom with a gimlet and drain off the under lye that may be collected there. After that is done I stop the hole with a spile and stir the composition, and if it be too thick I pour into it enough soft water enough to thin it to the consistency required, and again stir it well, and after leaving it in repose a week or ten days longer, if there be any under lye collected again, I drain that off also and stir the remaining composition in like manner as before. Now, after all these operations have been carefully and skillfully performed with pure and genuine ingredients the constituents will all be combined and remain so, (a specimen of which is marked E,) and then there will be about two gallons of the composition ready to be applied and used for all the lubricating purposes herein set forth.

What claim as my invention, and desire to secure by Letters Patent, is—

1. The composition made of the proximate acid principles of the herein-named ingredients and alkali by combining them together in the manner and proportions as herein substantially described, and for the purposes set forth.

2. The rejection of the under lye in the process and the substitution and mixture of water with the residual mass to reduce it to a thinner consistency for practical use, substantially as herein described and set forth.

JOHN B. McMUNN.

Witnesses:
GEORGE BRODHEAD,
C. A. LEWIS.